United States Patent
Gunasekar et al.

(10) Patent No.: US 7,924,816 B2
(45) Date of Patent: Apr. 12, 2011

(54) SYSTEM AND METHOD FOR SERVICING CALLS ORIGINATING VIA THE INTERNET

(75) Inventors: Duraisamy Gunasekar, Cedar Rapids, IA (US); Thomas Galvin, Hiawatha, IA (US); Tim E. Reynolds, Iowa City, IA (US)

(73) Assignee: MCI Communications Corporation, Basking Ridge, NJ (US)

( * ) Notice: Subject to any disclaimer, the term of this patent is extended or adjusted under 35 U.S.C. 154(b) by 1396 days.

(21) Appl. No.: 11/155,817

(22) Filed: Jun. 20, 2005

(65) Prior Publication Data

US 2005/0232173 A1   Oct. 20, 2005

Related U.S. Application Data

(63) Continuation of application No. 09/001,699, filed on Dec. 31, 1997, now Pat. No. 6,937,593.

(51) Int. Cl.
*H04L 12/66* (2006.01)

(52) U.S. Cl. ........ 370/352; 370/353; 370/354; 370/355; 370/356

(58) Field of Classification Search .................. 370/252, 370/352, 401, 402, 493, 353, 354, 355, 356, 370/379; 379/201, 88.17
See application file for complete search history.

(56) References Cited

U.S. PATENT DOCUMENTS

| | | | |
|---|---|---|---|
| 5,608,786 A | 3/1997 | Gordon | |
| 5,724,412 A | 3/1998 | Srinivasan | |
| 5,726,984 A | 3/1998 | Kubler et al. | |
| 5,749,075 A | 5/1998 | Toader et al. | |
| 5,751,706 A | 5/1998 | Land et al. | |
| 5,867,495 A * | 2/1999 | Elliott et al. | 370/352 |
| 5,943,399 A * | 8/1999 | Bannister et al. | 379/88.17 |
| 5,995,606 A * | 11/1999 | Civanlar et al. | 379/207.13 |
| 6,064,667 A | 5/2000 | Gisby et al. | |
| 6,078,581 A | 6/2000 | Shtivelman et al. | |
| 6,078,582 A | 6/2000 | Curry et al. | |
| 6,097,804 A | 8/2000 | Gilbert et al. | |
| 6,101,182 A * | 8/2000 | Sistanizadeh et al. | 370/352 |
| 6,104,704 A * | 8/2000 | Buhler et al. | 370/252 |
| 6,115,737 A * | 9/2000 | Ely et al. | 709/203 |
| 6,137,869 A | 10/2000 | Voit et al. | |
| 6,144,667 A | 11/2000 | Doshi et al. | |
| 6,157,648 A | 12/2000 | Voit et al. | |
| 6,188,683 B1 | 2/2001 | Lang et al. | |
| 6,282,284 B1 | 8/2001 | Dezonno et al. | |
| 6,292,478 B1 * | 9/2001 | Farris | 370/352 |
| 6,292,481 B1 | 9/2001 | Voit et al. | |
| 6,295,292 B1 | 9/2001 | Voit et al. | |
| 6,295,293 B1 * | 9/2001 | Tonnby et al. | 370/389 |
| 6,310,873 B1 | 10/2001 | Rainis et al. | |

(Continued)

FOREIGN PATENT DOCUMENTS

WO   WO/96/38018   11/1996

(Continued)

*Primary Examiner* — William Trost, IV
*Assistant Examiner* — Emmanuel Maglo

(57) ABSTRACT

A method for providing call services in a telecommunications system includes receiving a call request from a call origination station via the Internet. The call request may involve an advanced call service. The method may also include validating the call request and initiating a communications link between the call origination station and a telephony server via the Internet when the call request is validated. The method may further include initiating a telephony link between the telephony server and a call termination station when the call request is validated.

31 Claims, 6 Drawing Sheets

U.S. PATENT DOCUMENTS

| | | | |
|---|---|---|---|
| 6,320,857 B1 * | 11/2001 | Tonnby et al. | 370/352 |
| 6,324,264 B1 * | 11/2001 | Wiener et al. | 379/88.22 |
| 6,337,858 B1 * | 1/2002 | Petty et al. | 370/356 |
| 6,731,625 B1 * | 5/2004 | Eastep et al. | 370/352 |
| 6,937,593 B1 * | 8/2005 | Gunasekar et al. | 370/352 |
| 7,570,630 B1 * | 8/2009 | Phillips et al. | 370/352 |
| 2001/0040885 A1 | 11/2001 | Jonas et al. | |

FOREIGN PATENT DOCUMENTS

| | | |
|---|---|---|
| WO | WO/97/14238 | 4/1997 |
| WO | WO/97/27692 | 7/1997 |

\* cited by examiner

SYSTEM AND METHOD FOR SERVICING CALLS ORIGINATING VIA THE INTERNET

CROSS REFERENCE

The present application is a continuation of U.S. patent application Ser. No. 09/001,699 filed Dec. 31, 1997, the disclosure of which is hereby incorporated herein by reference.

BACKGROUND OF THE INVENTION

1. Field of the Invention

The present invention relates to advanced telephony services.

2. Description of the Related Art

Modern telephone call processing systems have enabled users to take advantage of many advanced telephony services. For example, the publicly switched telephone network (PSTN) now incorporates technology to allow users to take advantage of advanced services to make collect calls, calling card calls, debit card calls, etc. Often, these and other advanced services have been made possible through implementation and use of Intelligent Services Network (ISN) systems that are coupled to the PSTN. Such ISN systems include sophisticated computer and data processing systems and associated peripherals.

Although there has been wide-spread use of ISN systems within the PSTN to provide advanced telephony services, other technologies have been developed which are quickly becoming recognized for their ability to support telephony communications. For example, the proliferation of the Internet has given rise to Internet-based telephony systems. These systems allow a user along with his personal computer to operate a client software program (i.e., a World Wide Web "WWW" browser) to access an Internet site to engage in Internet telephony. The accessed Internet site typically includes a central server that acts as a hub to process and deliver digital streams (e.g., packet data representative of a user's voice) to another user that waits for the same. In essence, a call may be established via the central telephony server if the calling party and the called party are both available and ready to communicate. Unfortunately, however, such Internet-based telephony systems do not allow users to place calls to parties outside of the Internet such as parties that are coupled to the PSTN. Moreover, such Internet telephony systems do not offer advanced call processing services that PSTN users have come to enjoy and expect as a result of the use of ISN systems.

Accordingly, Internet telephony service providers face a significant problem in terms of how to implement advanced telephony services like those that are already available to users of the PSTN (e.g., collect call services, calling card services, etc.). At the same, ISN-based service providers also face a problem in that they have made significant investments in their ISN systems that do not presently incorporate links to Internet-based telephony technologies. As a result, users have no way of placing calls via the Internet which are destined for call termination locations that are coupled to other telecommunications networks such as the PSTN.

Thus, there exists a need to provide a system wherein telephone calls may originate via the Internet and be routed to call termination locations that are coupled to the PSTN. In order to be commercially feasible, such a system must allow calls that originate via the Internet to be provided with advanced telephony services such as collect call services, calling card services, debit card services, etc. Without such a system, Internet telephony users will not be able to take advantage of the advanced services and telephony features that are already available to the users of the PSTN. Moreover, in the absence of such a system, two distinct telecommunications systems will exist with no way to bridge the same to realize new and heightened levels of communication.

SUMMARY OF THE INVENTION

It is an object of the present invention to solve the aforementioned problems associated with the related art by providing a system for servicing telephone calls that originate via the Internet.

It is another object of the present invention to provide a telecommunications system wherein advanced telephony services may be provided to calls that originate via the Internet.

It is yet another object of the present invention to allow telephony users to place advanced telephony service calls via the Internet and have such calls routed to other Internet telephony stations or to any other telecommunications stations regardless of the telecommunications system to which they are connected.

The present invention has achieved such objects and, in so doing, has provided certain benefits in terms of call processing. For example, a person can now make a calling card or other advanced services type telephone call from an Internet telephony station and have that call routed to a telephony station that may be coupled to a publicly switched telephone network (PSTN). Additionally, Internet telephony service providers can now benefit from the advanced systems and services that are provided by the present invention by realizing revenues associated with servicing calls originating via the Internet and which may terminate in other telecommunications systems. As such, the present invention provides an enriched and expanded telecommunications system.

The present invention achieves its objects and provides the aforementioned benefits by providing a system and method for servicing a call request within a telecommunications system that includes and involves a client sub-system that is configured to generate a call request and to transmit the same via the Internet. The call request includes a call termination address and a service identifier. The call termination address corresponds to a call termination station that is coupled to a switching system. Also included and involved is an intelligent services network that is coupled to the client sub-system via the Internet and which is operative to receive and validate the call request and to process the call request in accordance with the service identifier. A telephony gateway sub-system is coupled to the intelligent services network via the switching system and to said client sub-system via the Internet. The telephony gateway sub-system is operative to communicate with the intelligent services network via the switching system to cause the intelligent services network to initiate a call to the termination address via the switching system and to couple the call to the client sub-system.

BRIEF DESCRIPTION OF THE DRAWINGS

The present invention is described in detail below with reference to the following drawing figures of which.

DETAILED DESCRIPTION OF THE PREFERRED EMBODIMENTS

Figure 1:
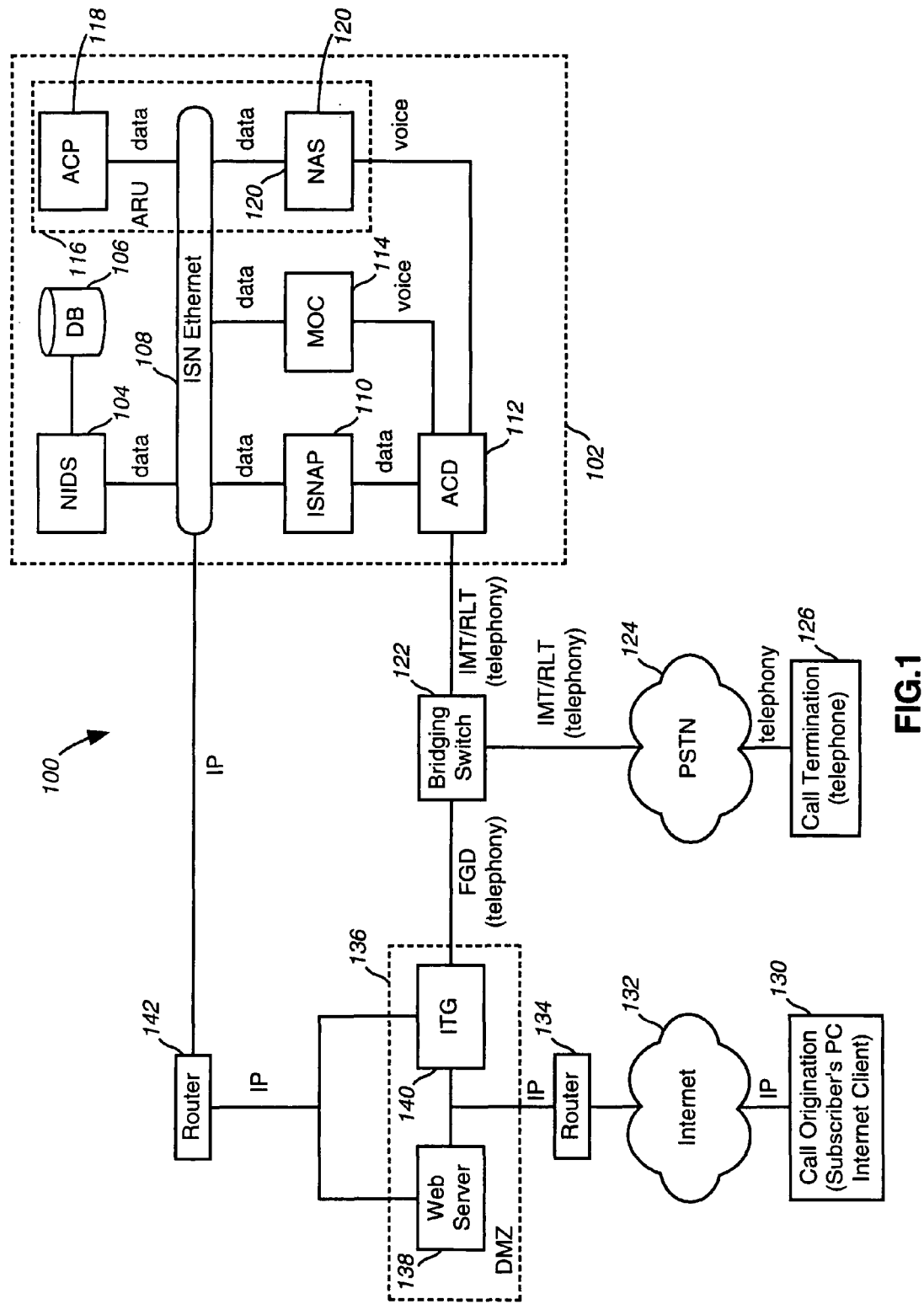
FIG. 1 is a block diagram that illustrates a system wherein advanced telephony services such ISN-based services are provided to calls that originate via the internet.

The present invention is now described in detail with regard to the drawing figures that were briefly described above. Unless otherwise indicated, like parts are referred to with like reference numerals.

System Overview

The paragraphs that follow outline the structures and their corresponding operations that enable the provision of advanced telephony services to telephone calls that originate via the Internet. In particular, the present invention allows users of Internet telephony technologies to take advantage of advanced services that were originally developed to service calls originating in a circuit-switched telephony environment.

According to the present invention, a call such as a calling card call originating via the Internet from an Internet telephony station (e.g., a multi-media personal computer equipped with sound production and voice capture capabilities) can be terminated at a call termination station that is coupled to the PSTN (e.g., a land-line telephone, a cellular telephone, a pager, a satellite telephone, etc.). To achieve such functionality, the present invention employs an Internet Telephony Gateway (ITG) system. The ITG system provides an interface between an Internet Protocol (IP) network (e.g., the Internet) and a telephony network such as the PSTN.

For example, in the case of a telephone call to a PSTN destination, an Internet user can originate a call session from an Internet telephony station to an Internet telephony service provider. After entering certain call request information (e.g., a called number, a calling card number, and personal identification number, etc.) into a web site maintained by the Internet telephony service provider, the Internet telephony service provider will engage in a call validation process to validate the call request. That call validation process will involve a query of an Intelligent Services Network (ISN) system database by the Internet telephony service provider to determine if the call can made and billed appropriately. If the call is validated, certain call information including a special telephone system routing number—a 1-800 number—corresponding to the ISN system is sent back to the Internet telephony station via the Internet. The Internet telephony station will then use that information to establish an Internet session with an ITG system which is maintained by the Internet telephony service provider.

In turn, the ITG system establishes a call on a circuit-switched telephony network via a bridging switch to the ISN system which will service the Internet-originated call. The ITG system will initiate its call to the ISN system by dialing the aforementioned special routing number (e.g., the 1-800 number corresponding to the ISN system) which was received by the Internet telephony station earlier during the call validation process as described above. On behalf of the Internet-originated call, the ISN system will then initiate a call to a call termination location via the bridging switch. Thereafter, when a called-party receives the call at the call termination location, the ISN system will cause the bridging switch to couple the two call legs (i.e., the leg from the Internet telephony station to the ITG system, and the leg from the ISN system on behalf of the Internet-originated call to the call termination location).

During the course of the call, the ITG system converts the IP packets of the calling party received by the ITG system via the Internet to telephony signals that can be carried over the PSTN, connected appropriately, and then delivered to the called party at the call termination location. Additionally, the ITG system will convert the telephony signals received via the PSTN from the called party to IP packets which may be transported to the calling party via the Internet.

The ISN system also is used within the present invention to provide advanced services to calls that originate via the internet. ISN systems were developed to provide services such as calling card services, debit card services, operator Services, 1-800 services, collect call services, etc. The present invention allows telephony customers to utilize such services via the Internet through use of the aforementioned ITG system and special telephony routing approaches which are described below with regard to FIGS. 3A and 3B.

As such, the following paragraphs describe exemplary components and systems employed within the present invention to provide advanced telephony services to calls that originate via the Internet.

System Description

Referring now to FIG. 1 depicted therein is a block diagram of a system for providing advanced telephony services such as ISN-based services to customers who originate telephone calls over the internet. In particular, system 100 includes and involves an Intelligent Services Network (ISN) system 102, a Data Management Zone (DMZ) 136 (which contains an ITG system 140), the Internet 132, a call origination station 130, a bridging switch 122, the publicly switched telephone network (PSTN) 124, and a call termination station such as call termination station 126. Each of these structures is further described below. In many cases, however, these structures will be readily understood by those skilled in the art and, accordingly, a detailed discussion is omitted for purposes of brevity.

Within system 100, ISN system 102 incorporates a network information distribution system (NIDS) server 104 which is an automatic data processing system (e.g., a server computer and data storage sub-system configuration) that is configured to provide call processing data to other call processing components maintained within ISN system 102. NIDS system 104 is coupled to a data store 106 and to an ISN Ethernet local area network 108. ETHERNET is a trademark of the XEROX Corporation. An ISN Adjunct Processor (IS-NAP) 110 performs call processing functions along with an Automated Call Distributor 112 (ACD) system to service and route calls through ISN system 102. ISN system 102 also includes one or more manually operated service consoles (MOC) 114 and Network Audio Servers 120 (NAS).

ISN system 102 further includes an automated call processor (ACP) to control the operations of its NAS unit(s). ACP 118 and NAS 120 are commonly grouped and classified as an Audio Response Unit (ARU) as indicated by the phantom lines forming the box identified as ARU 116. ACP 118 may be implemented on a computer system such as the IBM RS/6000 manufactured and market by International Business Machines Corporation, or a DEC alpha-based computer system manufactured and marketed by Digital Equipment Corporation.

Within ISN system 102, ACD 112 is coupled to PSTN 124 via bridging switch 122. As will be readily understood by those skilled in the art, the ACD is configured and arranged to receive calls from and/or routed through bridging switch 122, and to distribute those calls over voice telephony trunks to MOC 114 or to NAS 120 for processing. MOC 114 typically is a specialized computer-based workstation that is operated by a live operator and which is used to provide various operator services. NAS 120 is a computer system that is equipped with voice telephony ports to provide audio response services to a caller. NAS 120 is controlled by ACP 118 via ISN Ethernet 108. As noted above, NAS 120 and ACP 118 form ARU 116 which will be readily understood by those skilled in the art. A suitable ACD system that may be incorporated into ISN system 102 is the NORTHERN TELECOM DMS-100 system.

ISNAP 110 is included within ISN system 102 to control ACD 112. In particular, ISNAP 110 is a computer system that performs call processing functions for ACD 112. For example, when a call is received by ACD 112, ACD 112 queries ISNAP 110. ISNAP 110 determines which peripheral (MOC 114 or NAS 120) to which to route the call. Additionally, ISNAP 110 responds to ACD 112 with a command sequence for proper routing and then sends a "Call Offered" message over ISN Ethernet 108 to the selected peripheral.

NIDS 104 is a computer system that provides call processing data to the other call processing components that form ISN system 102. In particular, NIDS 104 stores data such as service subscriber account data for each service offered and provided by ISN system 102. For example, NIDS 104 stores calling card numbers and corresponding personal identification numbers (PIN numbers) that are used by ISN system 102 to validate calling card calls. Call request and call validation techniques carried out by a system such as ISN system 102 will be readily understood by those skilled in the art.

Within system 100, ISN system 102 is coupled to bridging switch 122 via an inter-machine trunk (IMT) line/RLT telephony link. Bridging switch 122 is a digital matrix switch such as a Northern Telecom DMS-250 or other switch of similar functionality that has release line trunk (RLT) signaling capabilities. In turn, bridging switch 122 is further coupled to a call termination unit 126 via a telephony link in a conventional manner. Additionally, Bridging switch 122 is further coupled to ITG system 140 via an FGD telephony type link which will be readily understood by those skilled in the art. It is important to note that bridging switch 122 may be coupled to other switches in PSTN 124 via additional IMT links or other types of links. Additionally, although bridging switch 122 is shown as a single switch, the present invention is not so limited. Other switch configurations may be chosen and implemented. All that is required, is that bridging switch 122 be able to connect a call that is to be routed to ACD 112 within ISN system 102.

As noted above, in system 100, ITG system 140 is part of DMZ 136 (shown in phantom lines). DMZ 136 represents an Internet service facility (which may be geographically dispersed) wherein a network web server such as an internet web server 138 is coupled to ITG system 140. Web server 138 and ITG 140 are coupled via a network link such as an internet protocol link (i.e., a TCP/IP link—referred to hereinafter as an IP link) through a router 134 via the Internet 132 to a call origination station 130 which is equipped with a personal computer and Internet client software (e.g., the NETSCAPE NAVIGATOR V.4.0 which is manufactured by NETSCAPE COMMUNICATIONS CORP.) and multi-media capabilities (e.g., sound capture such as through use of a micro-phone and sound production facilities such as through use of speakers or a head-set unit). DMZ 136 also is coupled via an IP link to a router system 142 which is further coupled to ISN Ethernet 108 of ISN system 102. NETSCAPE is a trademark of NETSCAPE Communications Corporation.

It should be understood that call origination station 130 preferably is a personal computing device operated by a subscriber of an advanced telephony service which is provided by an entity that operates ISN system 102. Of course, any device capable of interacting with a network such as the Internet may be considered as a call origination and/or call termination station according to the present invention. Preferably, however, a calling party that desires to originate an advanced service telephone call according to the present invention will configure his personal computing device and a world wide web browser to visit and transmit call initiation information to a web site maintained by an Internet telephony service provider.

The links coupling the various components of system 100 will be readily understood by those skilled in the art. For example, establishing, managing and operating a link from a call origination station at a calling party's PC through the internet to a web server will be readily understood by those skilled in the art of Internet technologies. Moreover, those skilled in the art of telephony technologies will readily understand FGD and IMT/RLT telephony links. Moreover, networking specialists will certainly understand the interconnection of computing elements via an Ethernet such as the links coupling the components of ISN system 102 via ISN Ethernet 108. Finally it will be readily understood that the link from PSTN 124 to call termination location 126 (e.g., a telephone) can be Dedicated Access Line (DAL), a local exchange carrier (LEC) line, an FGD link to another switch, etc.

Figure 2:
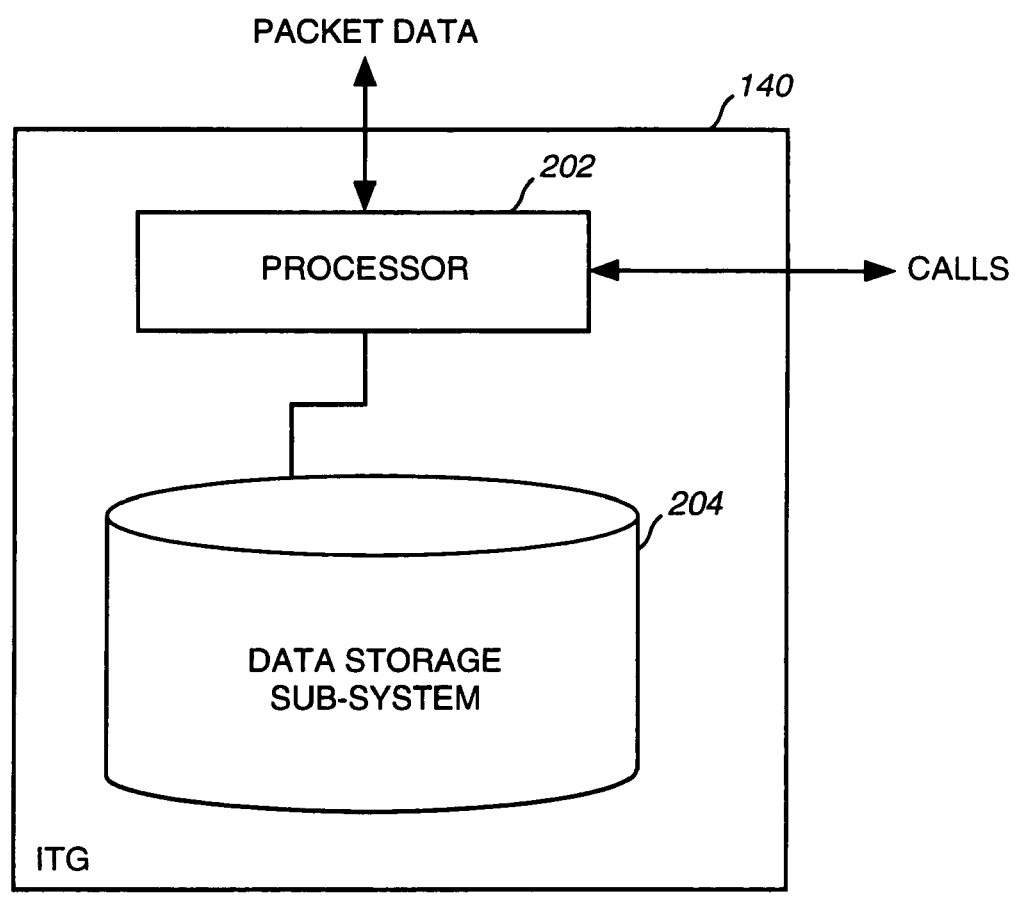
FIG. 2 is a block diagram that illustrates the structural components of the Internet telephony gateway system illustrated in FIG. 1.

Referring now to FIG. 2, depicted therein is a block diagram of ITG system 140. In particular, ITG system 140 includes an automatic data processing system having a processor 202 and a data storage sub-system 204. A suitable computer system that may be used to implement ITG system 140 is a SUN SPARC 20 computing system manufactured and marketed by SUN MICROSYSTEMS, INC., or one of similar or like functionality. Processor 202 is configured to be controlled via computer software programs and routines. Additionally, processor 202 includes hardware components that are capable of carrying out input and output on one or more I/O ports to communicate across a network architecture such as an Ethernet. The network I/O capabilities of processor 202 ere illustrated by the bi-directional arrow indicating that packet data may be processed by processor 202.

In addition to communicating with a network architecture like ISN Ethernet 108, processor 202 also is configured to communicate call signals via an FGD telephony link to bridging switch 122 as shown in FIG. 1. A configuration of the hardware and software necessary to carryout such FGD telephony type communications will be readily understood by those skilled in the art.

System Operation

The structures depicted in FIGS. 1 and 2 are configured to operate together to provide advanced telephony services such as ISN based services to callers who originate and receive telephone calls via the internet according to the present invention.

The following discussions illustrate the operations of the present invention in processing a calling card advanced service call that originates over the Internet and which is destined for a PSTN terminal location (e.g., a telephone). Other advanced services such as debit card services, collect call (e.g., 1-800-COLLECT) services, operator services, directory assistance services, etc. will be managed in similar fashion. And, other terminal devices such as cellular telephones, pagers, satellite telephone systems, radio telephones, etc. may be substituted for the PSTN terminal telephone station.

Figure 3A:
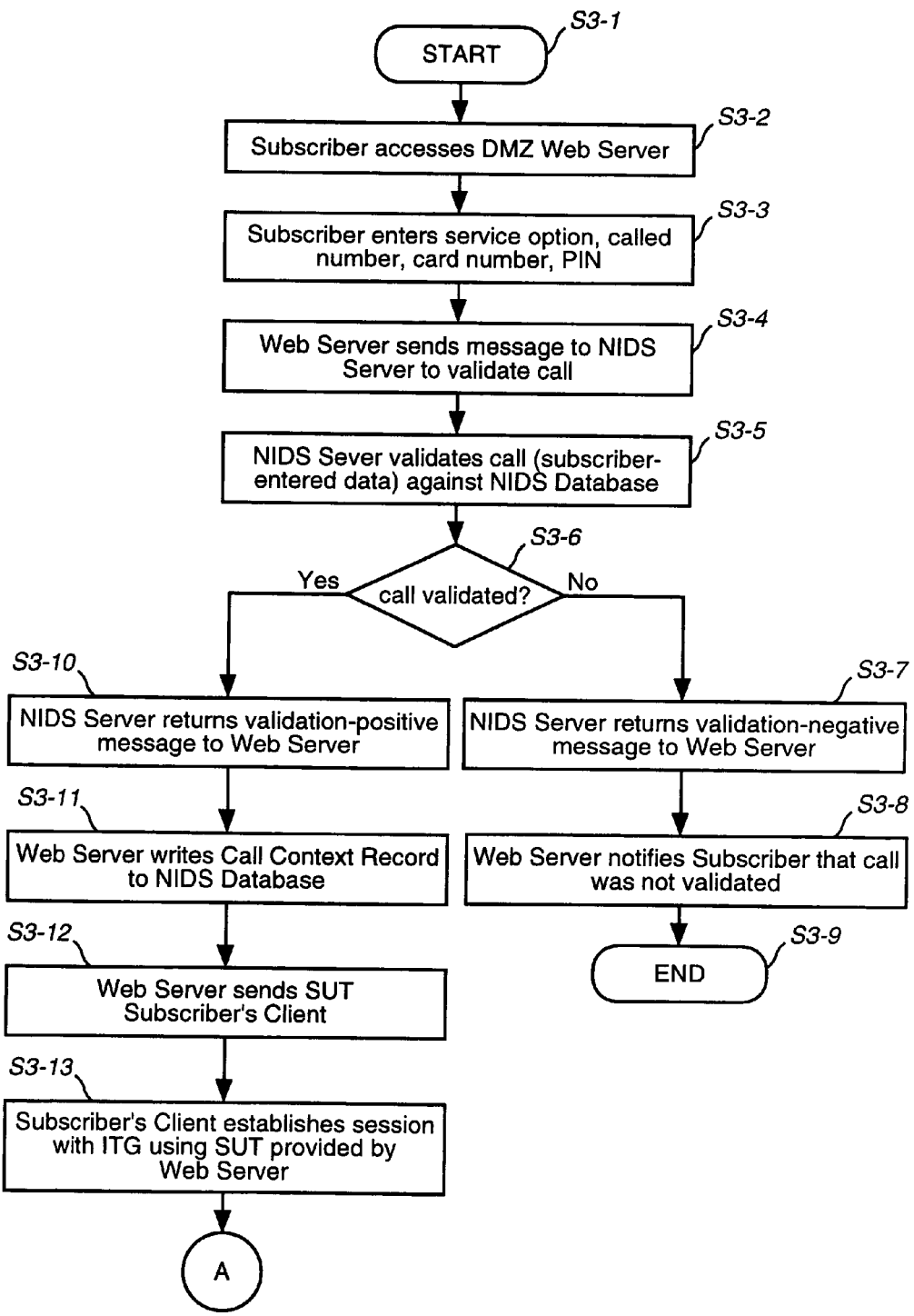
FIG. 3A is flowchart illustrating the operations carried out within the system depicted in FIG. 1.
Figure 3B:
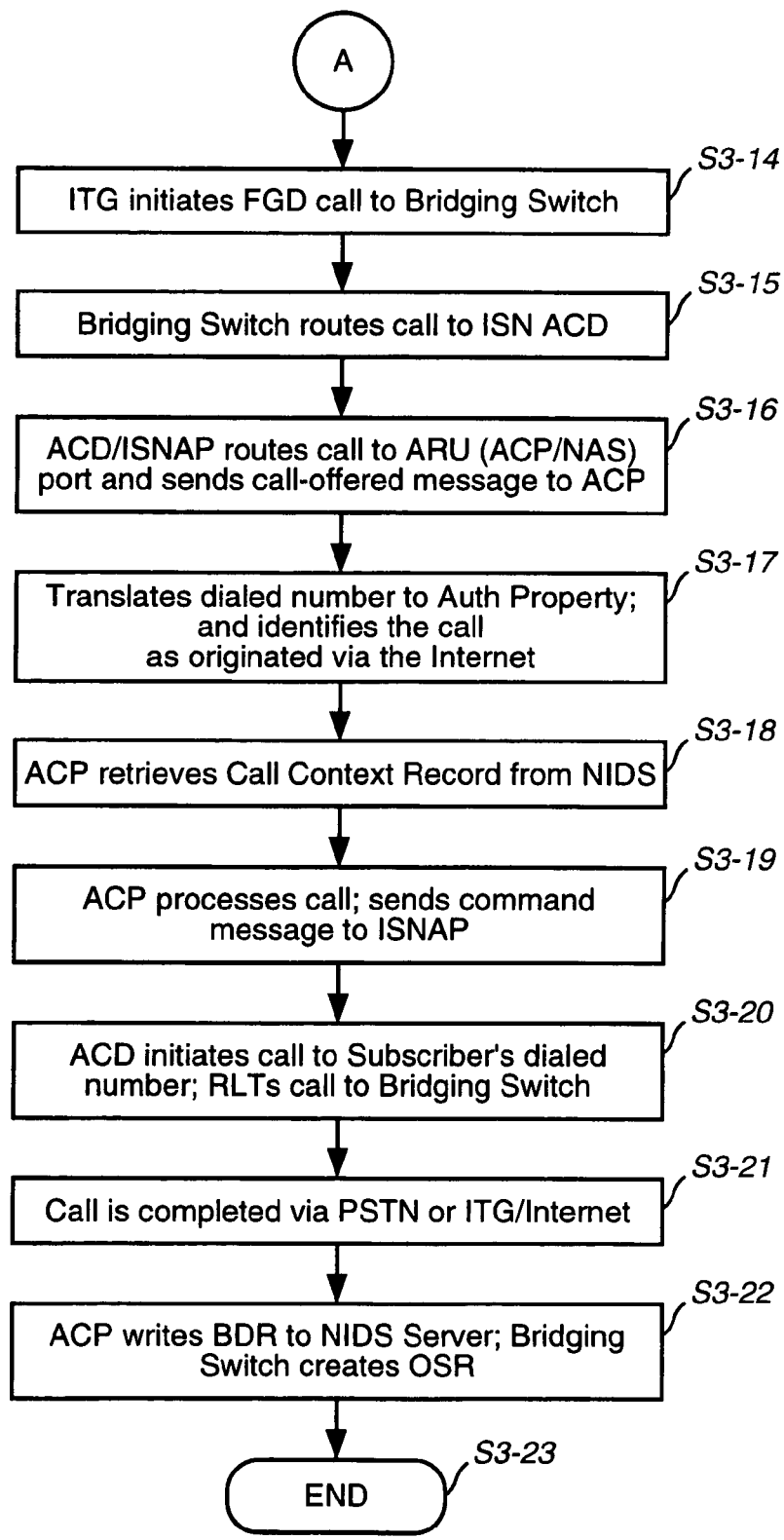
FIG. 3B is a continuation of the flowchart started in FIG. 3A.

Accordingly, referring now to FIGS. 3A and 3B, depicted therein is a flowchart that illustrates the operations of a calling party, a called party, and the structures within system 100 (FIG. 1) that are used to provide advanced telephony services via the Internet according to a preferred embodiment of the present invention.

Many of the operations illustrated in FIGS. 3A and 3B are carried out by ITG system 140. The system depicted in FIG. 1 and within ITG system 140, are configured to provide Internet telephony by using commercially available Internet telephony products such as network server applications developed, manufactured, and marketed by NETSPEAK CORPORATION (e.g., the NETSPEAK GATEWAY EXCHANGE package Release 0.9.9.14 as part of NETSPEAK BUILD Version 0.114) and database server applications to enable resource management by ITG system 140.

With specific reference to FIG. 3A, processing starts at Step S3-1 and immediately proceeds to Step S3-2 where a calling party accesses DMZ web server 138 (FIG. 1) via his web browser and is prompted (e.g., via an HTML data entry form that has appropriate CGI data gathering scripts supporting the same) to enter call initiation information. Accordingly, at Step S3-3 the calling party will enter a service option which designates the advanced service that is desired. Since calling card services are illustrated, the calling party also will enter a called number (the number or address of the called party), a calling card number, and a personal identification (PIN) number or identifier.

It is important to note that depending on the service that the calling party selects via his web browser, DMZ web server 138 (FIG. 1) will prompt calling party accordingly. Generally, except for directory assistance services, the calling party will most likely be prompted to enter a called number.

In any case, after the calling party enters the appropriate information based on a desired advanced telephony service, processing proceeds to Step S3-4, where web server 138 will send a message to NIDS server 104 via an IP link to validate the calling party's call request. The validation message sent by web server 138 will contain the service option, the calling card number, and the PIN number entered by the calling party.

Thereafter, at Step S3-5 the NIDS server will validate the call against the NIDS database 106 based on comparisons with the calling party's calling card number and his PIN number. If, at Step S3-6, the call is not validated (e.g., the calling party entered invalid information) processing proceeds to Step S3-7 where the NIDS server 104 will return a validation-negative message to DMZ web server 138. Thereafter, DMZ web server 138, at Step S3-8, will notify the calling party (via his web browser) that the call was not validated. Of course, looping constructs could be implemented to allow the calling party to re-enter certain information for another validation attempt.

Processing Ends at Step S3-9.

If at Step S3-6 the call was validated, processing proceeds to the step S3-10. At Step S3-10, the NIDS server 104 will return a validation-positive message to DMZ web server 138. Thereafter, processing proceeds to Step S3-11 where DMZ web server 138 will write a call context record to the NIDS database 106.

The call context record written to the NIDS database 106 will contain:
  An automatic number indicator (ANI) (i.e., a 10 byte character field) containing a Key to the call context record
  Card Number & PIN
  Called Number (Terminating Number specified by the calling party received via the Internet)
  Validation Status The Key is returned by NIDS server 104 to DMZ web server 138. The Key field is used to later access the record in the NIDS database. The Key may look like "1102345678" or any other string or representation of key characters or the like. Such Keys will be readily understood by those skilled in the art.

Next, at step S3-12 DMZ web server 138 will send a network COOKIE to the calling party's web browser. The COOKIE can, for purposes of discussion herein, be considered as an IP phone spawn file. Accordingly, DMZ web server 138 will create the IP phone spawn file which is to be used by the calling party's web browser ultimately to instruct ITG system 140. The IP phone spawn file will contain the following pieces of information:
  IP Address of the ITG System 140
  1-800 for the advanced telephony service (i.e., the telephone number that ITG System 140 must dial—the aforementioned "special routing" number)
  A single use tag (SUT) or the Key to the NIDS database record (as discussed above)

Thereafter, at Step S3-13, the calling party's web browser establishes a session with ITG system 140 using the COOKIE/IP phone spawn file provided by DMZ web server 104. In this way, a session is created between the calling party's web browser and the ITG system 140 using the H.323 standard for Internet call control protocol and the G723 algorithm for compressed digital audio over telephone lines. Both the H.323 standard and the G723 algorithm will be readily recognized and understood by those skilled in the art. Processing then proceeds at the top of FIG. 3B.

At step S3-14 at the top of FIG. 3B, the ITG system 140 will initiate an FGD call to bridging switch 122 by using the 1-800 number contained in the IP phone spawn file discussed above in regard to Step S3-12. The 1-800 number contained in the IP phone spawn file is the special routing number that will allow ITG system 140 to initiate a call to the proper ISN system that is ready to deliver advanced telephony services (e.g., card calling services) to the call via the Internet.

Accordingly, at Step S3-15, bridging switch 122 will route the call to the ACD 112 of ISN system 102 based on the special routing number (i.e., the 1-800 number stored in the IP phone spawn file).

Thereafter, at step S3-16, the ACD 112 and ISNAP 110 will route the call to ARU 116 port, specifically an NAS 120 port. In standard ISN processing, this is done by having the ACD 112 send a query to the ISNAP 110 which contains the dialed number (in this case the special routing number—the 1-800 number specified in the IP phone spawn file as discussed above in regard to Step S3-12). Based on the dialed number, the ISNAP 110 determines which ISN component or peripheral (NAS or MOC), and a group of ports on that peripheral, to which to route the call. Such processing is known as ISN Group Select. In effect, the ISNAP 110 will send a call to the ARU 116 to route the call to a particular port.

It is important to note that if the call, identified by the dialed number (i.e., the special routing 1-800 number) is for a service type that may require some sort of audio recording of the calling party's response, then the call is routed to an ARU. For example, for a 1-800-COLLECT call, an ARU must record the calling party's spoken name. The call may also be routed to an ARU if monitoring of the call is required such as for placing multiple outbound calls during one single call initiation. Alternatively, if the call does not require an ARU recording or monitoring processes, the call can then be held in queue on ACD 112 while it awaits processing.

In any case, at Step S3-17, ACP 118 will translate the dialed number to what is known as an "Auth Property" to thereby identify that the call originated via the Internet.

The Auth Property is used by ACP 118 and NIDS server 104 to identify a call type or application. Since the dialed number (the 1-800 number dialed by ITG system 140) specifies both the selected service option and the fact that it is an Internet-originated call, the Auth Property uniquely identifies the application that needs to be processed to NIDS server 106 and to ACP 118. The Call Offered message contains the Key to the call context record and Auth Property stored in the NIDS database 106. As noted above, ACP 118 will use ANI as the Key to access the database record in the NIDS database 106 to complete the call.

Next, at Step S3-18, the ACP also the ANI as the Key corresponding to the call context record to retrieve the call context record from the NIDS server 104 and the NIDS database 106.

Thereafter, at Step S3-19, the ACP 118 will process the call and send a command message to the ISNAP 110. The ACP 118 reads the called number which is stored in the call context record and will thereby know to place an outbound call to the called number.

At step S3-20, the ACD 112 will initiate a call to the called number. In particular, the ACP 118 sends a command message to instruct the ISNAP 110 to place a call to the called number using RLT. The ISNAP 110 generates the appropriate ACD commands. The ACD 112 initiates the call to the called number over the bridging switch 122. In accordance with RLT, the bridging switch 122 then connects or couples the termination call leg to the called number with the originating call from the calling party and, in particular, from the calling party's personal computer or other Internet telephony station. Once coupled, bridging switch 122 releases ACD 112 from the call.

It should be noted that not all calls that extend from ISN system 102 will use RLT signaling. Some calls need to be monitored by ISN ARU 116, and will therefore be extended via a conference link on the ACD 112.

In any case, at Step S3-21 the call will be completed via the PSTN or, alternatively, via ITG system 140 over the internet to another termination station such as a call termination telephone station 126.

In any case, the call initiated via the Internet will have benefited from the advanced call processing services provided by ISN system 102.

Finally, at Step S3-22, ACP 118 will write a billing detail record (BDR) to NIDS server 104 and NIDS database 106. Bridging switch 122 will create an operator service record (OSR). The BDR is used to bill the call, and contains various data including the calling party's account code (i.e., calling card number) and the called number. The OSR is based on the call routed to the ACD 112. The BDR and OSR are later matched and merged for appropriate processing.

Processing Ends at Step S3-23.

The operations illustrated above are based on typical ISN processing approaches and will be readily understood by those skilled in the art.

Figure 4:
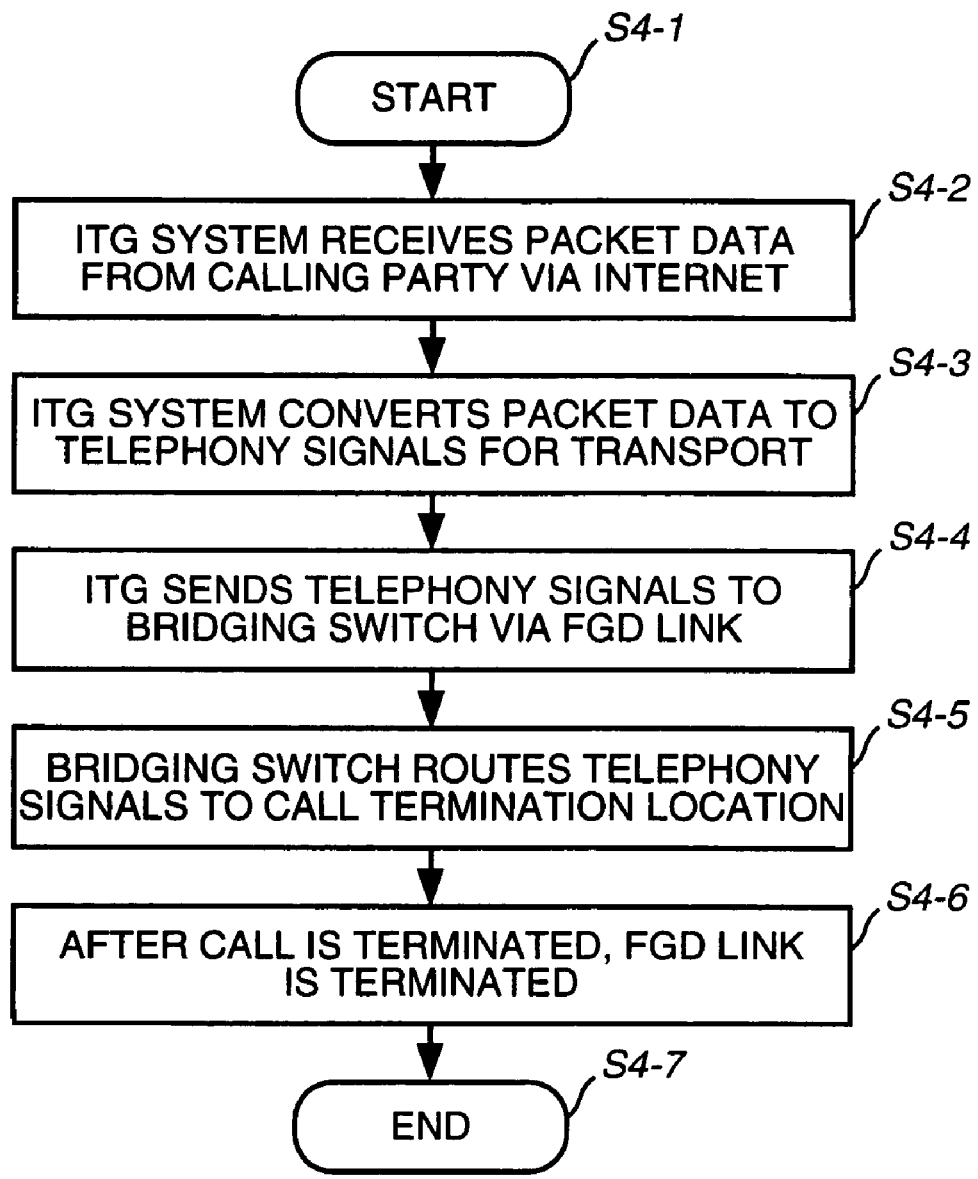
FIG. 4 is a flowchart that illustrates certain operations of the Internet telephony gateway system illustrated in FIGS. 1 and 2 to carry out call processing according to a preferred embodiment of the present invention.
Figure 5:
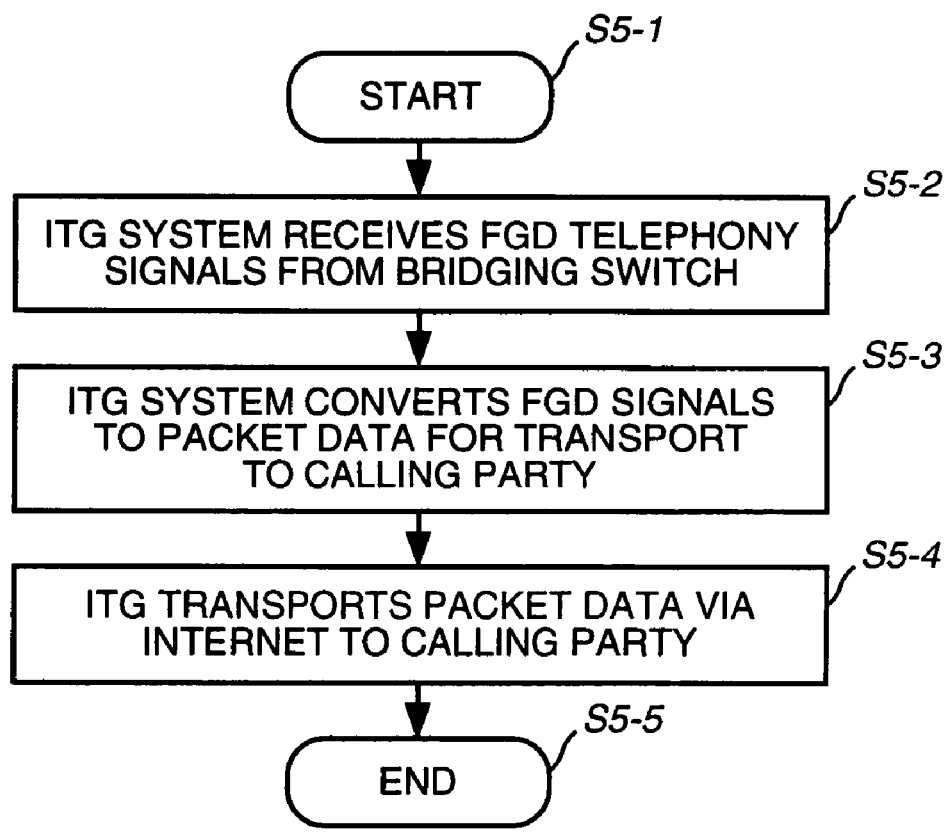
FIG. 5 is another flowchart that illustrates certain operations of the Internet telephony gateway system depicted in FIGS. 1 and 2 to carry out call processing according to another preferred embodiment of the present invention.

Referring now to FIG. 4, depicted therein is a flowchart that illustrates a process carried out by ITG system 140 to convert packet data received from a call origination station into FGD telephony signals which may be routed through bridging switch 122 to a call termination station coupled to a publicly switched telephone network. Processing starts Step S4-1 and immediately proceeds to Step S4-2. At Step S4-2, ITG system 140 receives packet data via the Internet. Thereafter, processing proceeds to Step S4-3 where ITG system 140 will convert the packet data to telephony signals for transport. Such a conversion will be readily apparent to those skilled in the art.

Next, at Step S44, ITG system 140 will transport the telephony signals to bridging switch 122 via an FGD telephony link. Thereafter, processing proceeds to Step S4-5 where bridging switch 122 will receive and cause the telephony signals to be routed to call termination location 126.

Finally, at Step S4-6, when the call is terminated either by the calling party or by the called party, ITG system 140 will terminate the FGD telephony link.

Processing Ends at Step S4-7.

Referring now to FIG. 6, depicted therein is a process carried out by ITG system 140 to convert FGD telephony signals into packet data which may be transported to a calling party via the internet. Processing starts at Step S5-1 and immediately proceeds to Step S5-2 where ITG system 140 will receive FGD telephony signals from bridging switch 122. Thereafter, ITG system 140 will convert the FGD signals in to packet data for transport.

Finally, at Step S54, ITG system 140 will transport the packet data via a network link and the Internet to the calling party for appropriate processing.

Processing Ends at Step S5-5.

In addition to the functionality described above, the present invention can be enhanced to allow subscribers and users of advanced telephony services to manage their subscriptions and accounts maintained by ISN system 102 via remote operation and over the Internet. Such functionality is described in co-pending U.S. patent application entitled INTERNET-BASED SUBSCRIBER PROFILE MANAGEMENT OF A COMMUNICATIONS SYSTEM, Ser. No. 08/925,370, filed on Sep. 8, 1997, which is incorporated herein by reference.

Thus, having fully described the present invention by way of example with reference to the attached drawing figures, it will be readily appreciated that many changes and modifications may be made to the invention and to any of the exemplary embodiments shown and/or described herein without departing from the spirit and scope of the invention which is defined in the appended claims.

What is claimed is:

1. A method for servicing a call request within a telecommunications system, comprising:

receiving, via a routing number corresponding to a particular one of a plurality of service options, a call request from a call origination station via the Internet;

establishing, via the Internet and based on the particular service option, a communications link between said call origination station and a telephony server via a switch, where at least part of the communications link between the call origination station and the switch is through an Internet Protocol (IP) link;

initiating a telephony link between said telephony server and a call termination station, via the switch, based on the particular service option, where the call origination station and the call termination station are different devices; and coupling, via the switch, said IP communications link to said telephony link.

2. The method of claim 1, where the initiating the telephony link comprises connecting to a telephone via a switched telephone network.

3. The method of claim 1, where the call termination station is a telephone device.

4. The method of claim 1, where the IP communications link comprises a TCP/IP link.

5. The method of claim 1, further comprising:
converting packet data transmitted from the call origination station to telephony signals; and
transmitting the telephony signals to the call termination station via the telephony link.

6. The method of claim 1, further comprising:
providing a user interface to the call origination station, the user interface including a number of options for selecting services, where one of the options comprises a collect call service option.

7. The method of claim 5, further comprising:
converting telephony signals transmitted from the call termination station to packet data; and
transmitting the packet data to the call origination station via the IP communications link.

8. A method, comprising:
receiving, via a routing number corresponding to a particular one of a plurality of service options, a call request from a call origination station via the Internet, where the call request includes a debit account identifier;
validating the call request based on the debit account identifier;
establishing, via the Internet and based on the particular service option, a communications link between the call origination station and a telephony server via a switch, where at least part of the communications link between the call origination station and the switch is through an Internet Protocol (IP) link;
initiating a telephony link between the telephony server and a call termination station, via the switch, based on the particular service option, where the call origination station and the call termination station are different devices; and
coupling, via the switch, the IP communications link to the telephony link.

9. The method of claim 8, further comprising:
establishing a call between the call origination station and the call termination station; and
coupling the IP communications link to the telephony link for a duration of the call.

10. The method of claim 8, further comprising:
establishing a call between the call origination station and the call termination station; and
generating billing information associated with the call, where charges associated with the call are assessed to a debit account associated with the debit account identifier.

11. The method of claim 8, where the initiating the telephony link comprises establishing a connection using a telephone number that corresponds to a telephone number operable within a switched telephone network.

12. The method of claim 8, where the IP communications link comprises a TCP/IP link.

13. The method of claim 8, further comprising:
converting packet data transmitted from the call origination station to telephony signals;
transmitting the telephony signals to the call termination station via the telephony link;
converting telephony signals transmitted from the call termination station to packet; and
transmitting the packet data to the call origination station via the IP communications link.

14. The method of claim 8, further comprising:
providing a user interface to the call origination station, the user interface including a number of options for selecting services, where one of the options comprises a debit account service option.

15. A method, comprising:
receiving, via a toll free telephone number corresponding to a particular one of a plurality of service options, a call request from a call origination station via the Internet;
establishing, via the Internet and based on the particular service option, a communications link between the call origination station and a telephony server via a switch, where at least part of the communications link between the call origination station and the switch is through an Internet Protocol (IP) link;
initiating a telephony link between the telephony server and a call termination station, via the switch, based on the particular service option, where the call origination station and the call termination station are different devices;
establishing, via the switch and an internet telephony gateway, a coupling between the communications link and the telephony link, where the internet telephony gateway is connected between the call origination station and the switch through the IP link;
transmitting, via the coupling, packet data from the call origination station to the internet telephony gateway;
converting, by the internet telephony gateway, the packet data transmitted from the call origination station to form telephony signals;
transmitting, via the coupling, the formed telephony signals to the call termination station;
converting telephony signals transmitted from the call termination station to form packet data; and
transmitting, via the coupling, the formed packet data to the call origination station.

16. The method of claim 15, where the toll free telephone number corresponds to a toll free telephone number operable within a switched telephone network.

17. The method of claim 15, where the IP communications link comprises a TCP/IP link.

18. The method of claim 15, further comprising:
providing a user interface to the call origination station, the user interface including a number of options for selecting services, where one of the options comprises a toll free call option.

19. A method, comprising:
providing a user interface to a first device, the user interface including a number of service options associated with placing a call from the first device to a different, second device, where the service options comprise a calling card option and an operator services option and where the first device is coupled to a packet switched network and the second device is coupled to a public switched telephone network;
receiving a routing number corresponding to a particular one of the service options based on input from the first device via the user interface;
initiating, via the packet switched network and based on the particular service option, communications link between the first device and a telephony server, via a switch, based on the received input, where at least part of the communications link between the first device and the switch is through the packet switched network;

initiating, based on the particular service option, a telephony link between the telephony server and the second device via the switch, where the telephony link is through the public switched telephone network; and coupling the communications link to the telephony link for a duration of the call.

20. The method of claim 19, where the input corresponds to a request to make a call using a calling card, the method further comprising:

receiving a calling card number and a personal identification number associated with the calling card from the first device;

validating the calling card number and the personal identification number; and receiving a telephone number associated with a call request from the first device, and where the initiating a communications link comprises:

initiating the communications link based on the received telephone number.

21. The method of claim 19, where the input corresponds to a request for operator services, the method further comprising:

receiving a request from the first device for operator assistance; and providing the operator assistance based on the request.

22. The method of claim 20, further comprising:

generating billing information associated with the call, where charges associated with the call are assessed to the calling card number.

23. The method of claim 21, where the providing operator assistance comprises:

providing directory assistance related to the operator assistance.

24. A system for processing a call within a telecommunications system, comprising:

a server to:
provide, via a packet switched network, a user interface to a call origination station, the user interface including information relating to a plurality of service options, receive, via the packet switched network, an input from the call origination station, the input corresponding to a request to make a call corresponding to a particular one of the plurality of service options, and forward the input to a processing platform; and the processing platform to:
receive the input from the server, determine, based on the particular service option, whether to approve the request, establish, via the packet switched network, communications link between the call origination station and a telephony server, via a switch, when the request is approved, where at least part of the communications link between the call origination station and the switch is through a packet switched communications link within the packet switched network, initiate a telephony link, via a public switched telephone network, between the telephony server and a call termination station, via the switch, when the request is approved, where the call origination station and the call termination station are different devices; and couple, via the switch, the packet switched communications link to the telephony link for a duration of the call.

25. The system of claim 24, where the input corresponds to a request to make a collect call.

26. The system of claim 24, where the input corresponds to a request to make a toll free call.

27. The system of claim 24, where the input corresponds to a request to make a call to be charged to a debit account.

28. A system for servicing a call request within a telecommunications system, comprising:

a first system to:
receive, via a routing number corresponding to a particular service option of a plurality of service options, a call request from a user device via the Internet, and forward the call request; and a second system coupled to the first system, the second system to:
receive the call request from the first system, determine, based on the particular service option, whether to validate the call request, establish, via the Internet, a communications link from the user device to an Internet telephony system, via the switch, when the call request is validated, where at least part of the communications link between the user device and the switch is through an Internet Protocol (IP) link, establish, via the switch, a telephony link from the Internet telephony system to a call termination device via a public switched telephone network, where the user device and the call termination device are different devices, and couple, via the switch, the IP communications link to the telephony link for a duration of a call established between the user device and the call termination device.

29. The system of claim 28, where the call request is associated with a collect call service.

30. The system of claim 28, where the call request is associated with a toll free service.

31. The system of claim 28, where the call request is associated with a debit account service.

* * * * *